United States Patent [19]

Wiethoff

[11] 3,828,654

[45] Aug. 13, 1974

[54] PISTON FOR TORQUE TRANSMITTING APPARATUS OF THE SWASH PLATE TYPE

[75] Inventor: Roger H. Wiethoff, Wayzata, Minn.

[73] Assignee: FMC Corporation, San Jose, Calif.

[22] Filed: Aug. 3, 1972

[21] Appl. No.: 277,540

[52] U.S. Cl.................... 91/488, 92/158, 92/255
[51] Int. Cl. ....... F01b 31/10, F16j 1/00, F04b 1/00
[58] Field of Search ............ 91/486, 488, 489, 499; 92/156, 157, 158, 181, 172, 255

[56] References Cited
UNITED STATES PATENTS

| | | | |
|---|---|---|---|
| 1,521,388 | 12/1924 | Pielstick............................... | 92/255 |
| 2,679,210 | 5/1954 | Muller.................................. | 91/488 |
| 2,721,519 | 10/1955 | Henrichsen........................... | 91/473 |
| 3,106,138 | 10/1963 | Thoma................................. | 91/488 |
| 3,131,539 | 5/1964 | Creighton............................. | 60/487 |
| 3,188,973 | 6/1965 | Firth et al............................. | 91/488 |
| 3,223,046 | 12/1965 | Eickmann............................. | 91/488 |
| 3,319,575 | 5/1964 | Havens................................. | 91/488 |
| 3,373,696 | 3/1968 | Geyer................................... | 91/488 |

FOREIGN PATENTS OR APPLICATIONS

| | | | |
|---|---|---|---|
| 1,529,432 | 6/1968 | France.................................. | 91/488 |
| 646,483 | 4/1958 | Canada................................. | 91/488 |

Primary Examiner—William L. Freeh
Assistant Examiner—G. P. LaPointe
Attorney, Agent, or Firm—R. S. Kelly; C. E. Tripp

[57] ABSTRACT

A piston for a hydraulic swash plate motor or pump is provided with an internal helical capillary passage of extended length for conducting part of the operating fluid, directed against the head of the piston, at a controlled pressure and flow rate to the swash plate and to the bearing shoe between the ball end of the piston and the swash plate for lubrication purposes and for providing a hydraulic balance for the thrust load on the piston.

6 Claims, 4 Drawing Figures

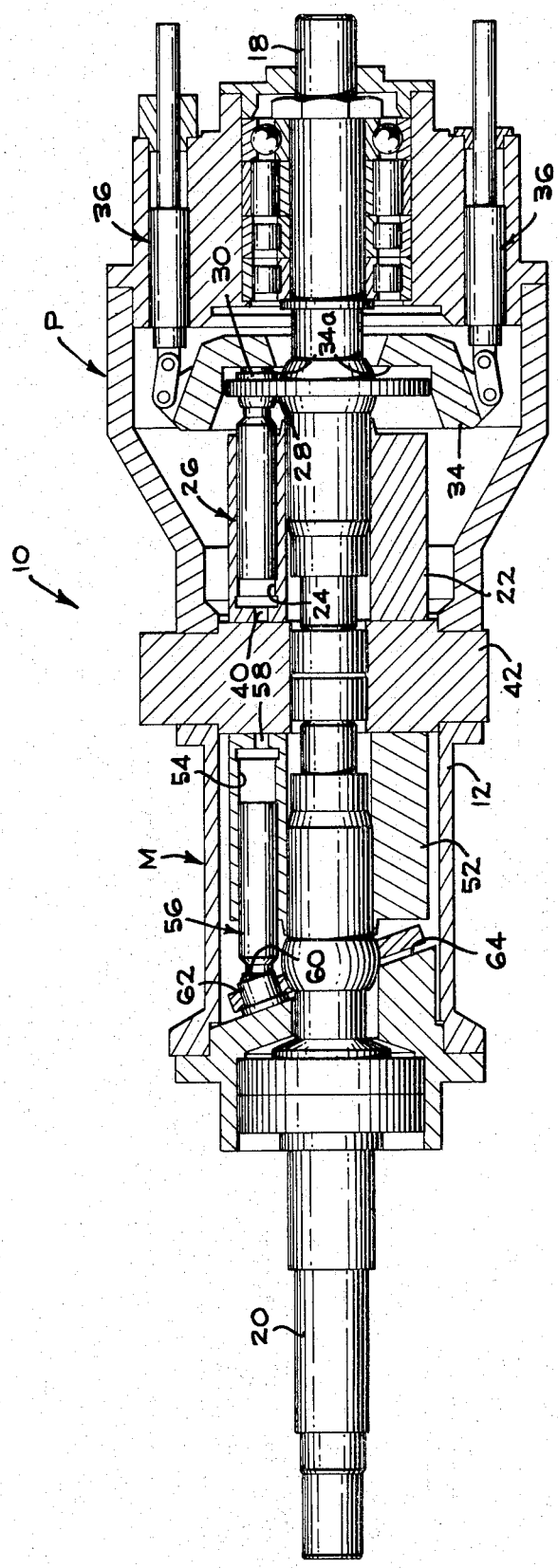

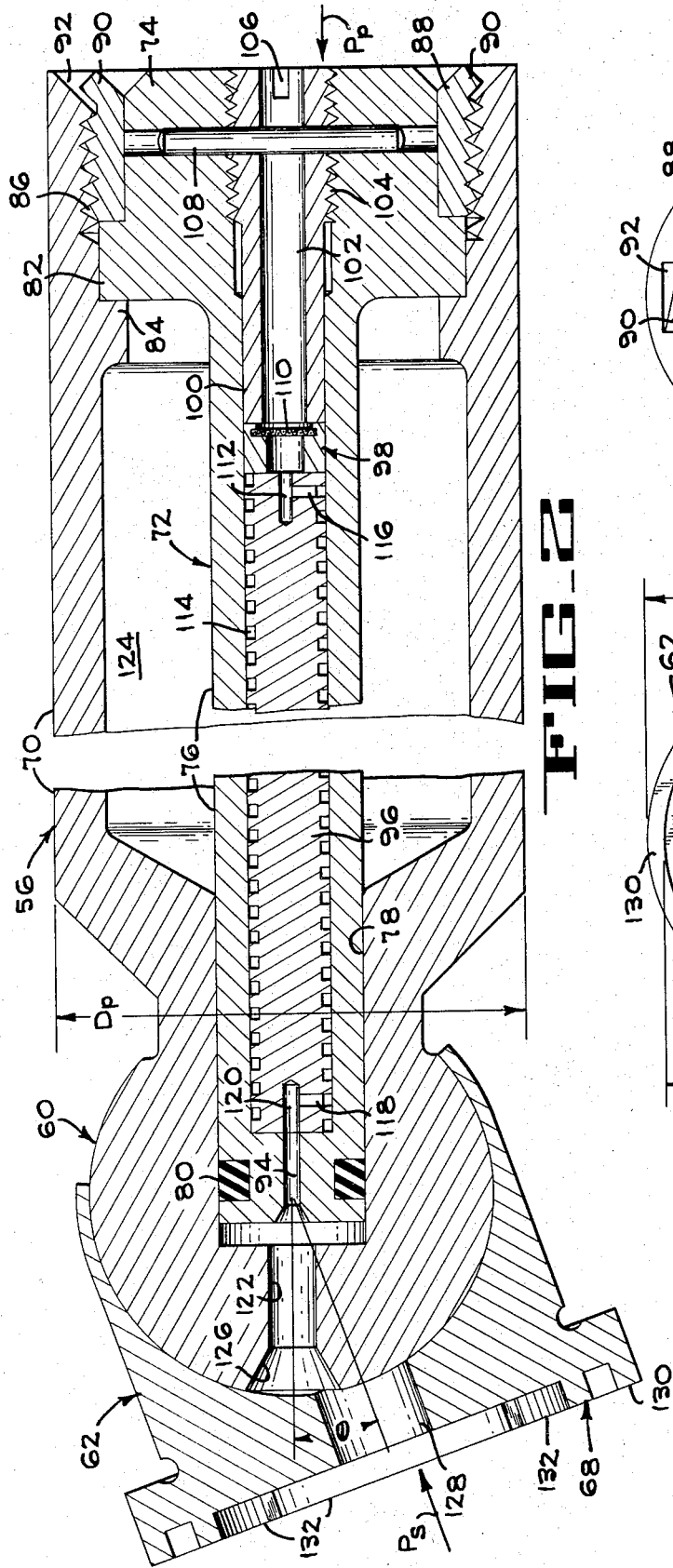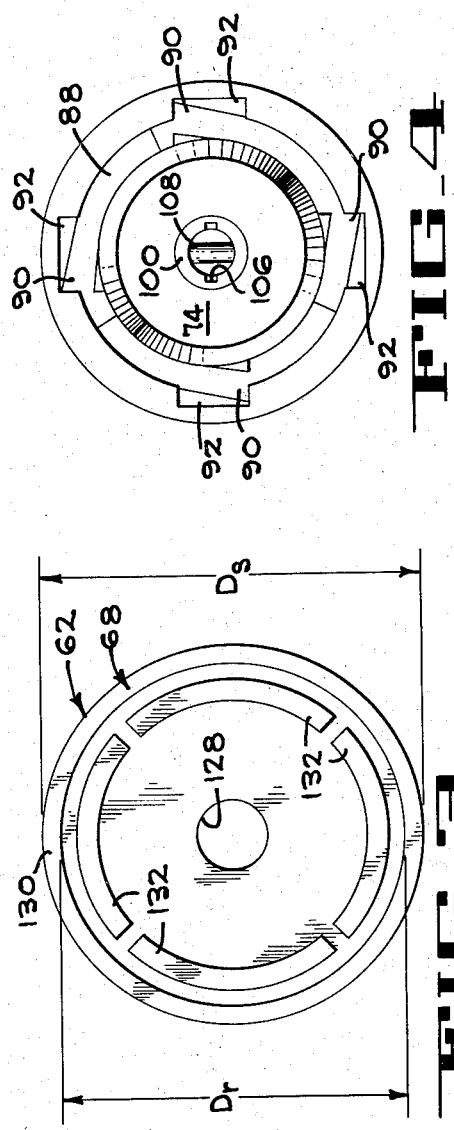

PISTON FOR TORQUE TRANSMITTING APPARATUS OF THE SWASH PLATE TYPE

BACKGROUND OF THE INVENTION

The field of the present invention is in swash plate type hydraulic pumps, motors, and hydrostatic transmissions using combined pumps and motors, which are now highly refined and efficient mechanisms. These mechanisms, however, still share a common wear problem relating to deficient lubrication and the resultant excessive wear of the pistons, swash plate and bearing shoes.

A typical prior art swash plate motor operating in conjunction with a variable displacement pump in a hydrostatic transmission will include a power output shaft carrying a cylinder block having a circumferentially arranged series of cylinders and pistons extending parallel to the axis of the shaft. The pistons have ball ends mounted in bearing shoes. Each bearing shoe has a spherical socket engaged with the ball end of a piston and an opposite flat end slidable on the swash plate, which is a circular plate arranged in oblique relation to the axis of the shaft. When the pump sequentially pressurizes the cylinders, the bearing shoes are thrust against the swash plate to develop a rotary torque which revolves the cylinder block and output shaft. In turn, the work load on the output shaft causes high multi-directional thrust loads on the pistons and bearing shoes, and it has always been a problem to provide adequate lubrication of these parts under all load conditions.

The outside diameter of the bearing face of a shoe ($D_s$) is conventionally made somewhat larger than the piston diameter ($D_p$), and the face of the shoe has a relieved area of diameter ($D_r$) which carries the system pumping pressure through one or more passages extending axially through the piston and shoe. This arrangement provides lubrication to the face of the shoe as well as providing a hydraulic balance for the thrust load on the piston. It has been determined that the average pressure ($P_l$) across the non-recessed, or land portion, of the shoe face must be some fraction (N) of the pumping pressure ($P_p$) greater than 0.5 in order that the shoe will not lift off the swash plate during operation of the mechanism. It has been found by experimentation that a value of $N = 0.6$ serves all conditions of pump speed and pressure. The fraction $N$ is related to the pump and piston design parameters by the equation:

$$P_l/P_p = N = \text{(Secant Swashplate Angle)} \; D_p^2 - D_r^2 / D_s^2 - D_r^2$$

In swash plate type hydraulic motors, however, a supercharge pressure is added to the normal pumping pressure to make up fluid leakage when the mechanism is running, to reduce cavitation on the low pressure side, and to aid in keeping the shoes in contact with the swash plates. When the pump is on zero stroke and the motor is stationary, the supercharge pressure exerts force upon the pistons to squeeze out the oil film between the shoe lands and the swash plate of the motor. Thus, when it is desired to resume rotation of the motor, an appreciable amount of stroke and corresponding differential pressure is required. This creates a "dead zone" which is particularly undesirable if the mechanism is used in a servo drive. In order to reduce this "dead zone," a film of fluid must be maintained under the shoe lands when the motor is stationary; however, if the full pumping pressure is directed through the piston to the shoe face, this result cannot be achieved without also creating a condition wherein the shoes may lift off the swash plate when the motor is operating at full speed.

One way of solving the aforedescribed problem is to limit the amount of flow through the piston to a predetermined amount. Thus, an orifice can be provided in the passageway through the piston, and the shoe recess diameter can be increased to a diameter equal to the piston pressure face diameter times the square root of the secant of the swashplate angle. With this arrangement there is a definite flow of fluid, depending upon pumping pressure, to the shoe face, and a corresponding film between the shoe land and the swash plate. Also, the flow rate will be inherently self stabilizing for any given pumping pressure. A major drawback of this arrangement is that the orifice size required for a reasonable flow rate is quite small, in the order of 0.005 to 0.010 inches in diameter. Such small holes in a hydraulic device are readily plugged, and, if such an event were to occur, the resultant loss of lubrication upon the piston end and shoe face would lead to a relatively rapid failure of the mechanism.

SUMMARY OF THE INVENTION

According to the present invention, the simple efficiency of a properly operating bleed passage through the piston is recognized and utilized, and special provisions are used for ensuring that the passage will always be open and unobstructed. For this purpose, the piston is formed or constructed in a special manner to provide, entirely within the piston, a tortuous bleed or capillary passage having a relatively large cross section to prevent blockage and a relatively long developed length to provide the necessary low flow rate. The length of the capillary passage should be several times the axial length of the piston, and, in the preferred embodiment of the invention disclosed, the passage is formed as a helical thread on one of two adjacent cylindrical surfaces. Since most hydrostatic transmissions operate at a known, narrow range of viscosities, the capillary flow can be readily calculated even though the flow is dependent upon the viscosity of the hydraulic fluid.

According to another aspect of the invention, the piston can also retain a relatively light weight construction to keep the reciprocating mass low, with the advantages outlined hereinbefore.

It is an important feature of the invention that a film of fluid will be maintained between the bearing shoe and swash plate under all operating conditions, to thus reduce starting torque when the pump is at zero displacement and the motor stopped, as well as to minimize the running wear. An equally important feature is that the improvement afforded by the present invention can be utilized in an existing swash plate apparatus by incorporating pistons in accordance with the present invention and without otherwise modifying the construction of the apparatus.

BRIEF DESCRIPTION OF THE DRAWINGS

FIG. 1 is a schematic longitudinal section through a typical hydrostatic transmission of the variable displacement pump, fixed displacement motor type which may utilize the pistons of the present invention.

FIG. 2 is an enlarged longitudinal section, partly broken away, through a piston and bearing shoe according to the present invention.

FIG. 3 is a slightly reduced end elevation of the bearing shoe shown in FIG. 2.

FIG. 4 is a reduced end elevation of the piston head end of the FIG. 2 structure.

DESCRIPTION OF THE PREFERRED EMBODIMENT

FIG. 1 schematically illustrates a more or less typical hydrostatic transmission 10 which includes a multi-part housing 12 having at one end a variable displacement hydraulic pump P, and at the other end a fixed displacement hydraulic motor M which is energized by the output of the pump. Thus, the pump P is coupled to and driven by a power input shaft 18, and the motor M drives a power output shaft 20. Lubrication of the pump and motor is effected by the operating fluid.

The power input shaft 18 carries a cylinder block 22 having a circumferential series of cylinder bores 24 (only one being shown), each of which is provided with a piston 26. The portion of each piston projecting from the cylinder block has a ball end 28 which rests in the complementary recess of a bearing shoe 30 that slides across an annular flat face 34a of a non-rotatable swash plate 34.

When the power input shaft 18 is driven with the swash plate 34 in the position shown in FIG. 1 (normal to the axis of the input shaft 18), there will be no axial movement of the pistons 26 and the pump will have zero output. By means of tilt mechanism linkage, indicated at 36, the swash plate 34 can be tilted obliquely of the axis of the input shaft 18 so that rotation of the cylinder block 22 causes axial movement of the pistons 26 and pumping of the hydraulic fluid. The fluid is admitted to, and pumped from, each piston through a port 40 at the inner end of the cylinder block which registers with an aperture, not shown, in a fixed valve plate 42 as the cylinder block 22 rotates.

The motor M has similar components to the pump P, including a cylinder block 52 splined to the power output shaft 20 and having a circumferential series of cylinder bores 54 (only one being shown), each provided with a piston 56 and a port 58. The portion of each piston which projects from the cylinder block has a ball end 60 that is engaged with a complementary recess in a bearing shoe 62. For energizing the motor M, the fluid discharged under pressure from the pump pistons 26 is sequentially admitted by the valve plate 42 into the ports 58 of the motor cylinder bores 54 to axially force the bearing shoes 62 against a fixed, inclined swash plate 64. Due to the inclination of the swash plate, the reaction forces deliver a lateral thrust to the pistons and cylinder block, thus turning the power output shaft 20 with a rotational torque dependent upon the displacement of the pump pistons, the operating pressure, and other known factors.

The exterior of the piston 56 (FIG. 2) and the bearing shoe 62 is typical of prior constructions, while the interior construction of the piston and certain dimensional relations, both of the piston and bearing shoe, is the concern of the present invention.

As previously indicated, it is conventional to provide a very small diameter continuous passage through the piston of a hydraulic motor, such as an axial passage extending through the piston head and through the ball end 60 of the piston to provide positive lubrication for the ball end and the bearing shoe. Additionally, the bearing shoe is typically provided with an axial passage to transmit part of the fluid to the end surface at 68 which contacts the swash plate. Thus, assuming the passages through the piston and bearing shoe are open, a part of the fluid which drives the piston is bled through the piston and bearing shoe to effect lubrication of these elements. In those prior art pistons wherein a hydraulic balance was attempted by carefully controlling the lubrication flow, the passage through the piston had such minute dimensions that it was very prone to becoming plugged. Of course, if stoppage occurs, the swash plate, bearing shoe and piston can be damaged beyond repair in a relatively short time, and, in a noisy environment, possibly without the malfunction even being known before it is too late to prevent the damage by shutting down the system. A further consideration is that it may be impossible to shut down the system, even if the malfunction is known, because of the process or function performed by the system which may be more costly to interrupt than to accept damage to the hydraulic motor.

The present invention provides positive assurance that the swash plate, bearing shoe and piston are always adequately lubricated. For this purpose, the piston 56 includes a hollow outer cylindrical shell 70, and an interior plug or capillary assembly 72 having an enlarged end portion 74 which forms the head of the piston. The plug assembly 72 is provided with a tubular stem 76 which extends into an axial bore 78, in the ball end 60, and is sealed therein by an O-ring seal 80. Included in the enlarged end portion 74 is a radial flange 82 that seats against a cooperating flange 84 which is formed in the piston shell 70 to axially retain the plug assembly 72 in one direction. Retention of the plug assembly in the other direction is by means of an externally threaded sleeve 86 that is threaded into the shell 70 in abutting relation with the flange 82. To maintain this assemblege, the retaining sleeve 86 (FIG. 4) is provided with a deformable rim 88 that is punched outward at circumferentially spaced positions 90 into several recesses 92 formed in the adjacent surface of the shell 70.

The stem 76 is provided with a closed end, adjacent the O-ring 80, having an axial outlet passage 94. Between the closed end of the stem and the piston head end portion 74, the stem encloses an exteriorly threaded plug 96, a filter screen unit 98, and a spacer tube 100 having an axial bore 102 and external threads 104. During assembly, the spacer tube 100 is threaded into the plug assembly 72 via a tool slot 106, and the enlarged end 74 of the plug assembly and the spacer tube are drilled through transversely for the installation of a diametric locking pin 108. With the construction thus far described, it will be apparent that all of the interior components of the piston 56 can be removed for replacement, cleaning or repair.

During operation, part of the fluid under pressure from the cylinder in which the piston operates is admitted to the interior of the piston assembly through the spacer tube bore 102. This fluid passes through the filter screen unit 98, the screen 110 of which has very small apertures to prevent entrained contaminants from reaching an inlet passage 112 of the plug 96.

The threads on the outer surface of the plug 96 are of square cross section to form a helical groove 114 in conjunction with the adjacent interior cylindrical surface of the stem 76. Intersecting the passage 112 is a radial passage 116 for transmitting operating fluid under pressure to the helical groove 114. A close fit of the plug 96 in the tubular stem 76 inhibits cross flow among adjacent portions of the helical groove 114, and all flow through the piston will be directed from the inlet passage 112 along the entire length of groove 114. The other end of the helical groove communicates, via outlet passages 118 and 120, with the passage 94 in the closed end of the tubular stem 76.

It will be evident that the helical groove 114 forms a bleed or capillary passage of relatively long developed length; also, the groove has a relatively large cross section as compared with the minimum dimension of the prior art linear piston passages. Accordingly, with knowledge of the fluid viscosity and other known parameters, the dimensions of the passage formed by the groove 114 can be calculated for a desired pressure drop and flow rate for its intended lubricating and pressure balancing function. The developed length of the helical groove should be at least three times the axial length of the piston, and, in the preferred embodiment of the invention disclosed, it is in the order of ten times the axial length of the piston.

The fluid delivered to the outlet passage 94 flows through a passage 122 extending through the ball end 60 on the driving end of the piston. At its terminal end, the passage 122 flares outward at 126 so as to maintain constant communication, without restricting the flow rate, with a central bore 128 through the bearing shoe 62 as the end surface 68 of the shoe slides over the face of the swash plate 64 (FIG. 1) and rotates relative to the ball end 60. Thus, each power stroke of the piston 56 provides a predetermined flow of the operating fluid, and at a predetermined pressure drop, to the wear surfaces of the bearing shoe, piston and swash plate.

The primary purpose of the O-ring 80 is to provide a seal and direct the capillary flow to lubricate the above noted wear surfaces; but in actual practice, over an extended period of operation, it is probable that fluid will leak into and fill the chamber at 124 between the hollow shell 70 and the plug assembly 72. However, it is within the scope of this disclosure that fluid can be permanently prevented from entering the chamber 124 by providing a series of O-rings 80 between the one ring shown and the chamber 124 and/or a face seal between the end of the stem 76 and the bottom of the bore 78 in the bearing shoe. By permanently excluding the operating fluid from the chamber 124, an operational advantage is achieved in that the reciprocating mass of the piston is minimized.

As shown in FIG. 3, the end surface 68 of the bearing shoe 62 is formed with a recess defined by a continuous annular land 130. The bearing shoe is also provided with interrupted semi-annular lands 132. As will be later explained, the dimensions of these elements are determined by calculations of the flow rate and pressure drop through the piston.

In a hydraulic pump or motor of the type disclosed, the thrust of the pistons is counteracted by the bearing shoes in contact with the swash plate. With reference to FIGS. 2 and 3, the outside diameter of the bearing shoe 62 ($D_s$) is made somewhat larger than the diameter of the piston 56 ($D_p$), and the face of the bearing shoe has a relieved area of diameter ($D_r$). In one conventional prior art piston construction, the passage through the piston and bearing shoe was large enough so as to provide a fluid pressure at the wear face of the bearing shoe 62 which was the same as the pumping pressure of the system at the piston head. As pointed out previously, in such piston constructions the pressure across the land area of the shoe face (i.e., $D_s$-$D_r$) was conventionally set at six-tenths of the pumping pressure.

Another way of providing lubrication and thrust balance for the pistons is that method which has also been previously described—the provision of a small diameter orifice through the piston and bearing shoe. In this case the shoe recess ($D_r$) is increased to $D_r = D_p \sqrt{\text{Secant of Swashplate Angle}}$ This provides a definite flow of fluid for lubrication as long as the orifice is open, i.e., unplugged, but its very small diameter, which may be 0.005 to 0.010 of an inch, makes eventual blockage of the orifice probable. Blockage results in loss of lubrication and rapid damage to the bearing shoe, swash plate and the ball end of the piston.

In the present invention, the long fluid passage formed by the helical groove 114 has a relatively large cross section to positively prevent plugging and to provide adequate lubrication under all operating conditions. For a groove 114 of square cross section, the flow ($q$) formula is:

$q = K A^2 (\Delta P/u\, l)$ where $K$ is a constant, $A$ is the cross sectional area of the passage, $\Delta P$ the drop in pressure through the piston, $u$ the average fluid viscosity, and $l$ the developed length of the piston passage.

The force on the cylinder end of the piston 56 is:

$P_p D_p^2 \pi/4$

The piston force is counteracted by a force on the bearing shoe 62 equal to:

$P_s (\pi/4) D_s^2 (\text{Secant } \theta)$, where $\theta$ is the swashplate angle and $P_s$ is the pressure of the fluid at the bearing shoe recess.

The latter force results from the pressure $P_s$ on the recess area $D_r$ and one-half of the pressure $P_s$ acting on the area of the land 130. The recess diameter $D_r$ is made equal to $D_p\, \sqrt{\text{Secant } \theta}$. Form these proportions, the pressure drop through the passageway in the piston is:

$\Delta P = P_p - P_s = P_p\{1 - [2D_p^2 (\text{Secant } \theta)/D_p^2 (\text{Secant } \theta) + D_s^2]\}$ The flow through the groove 114 is $q = 0.03535 (S^4 \Delta P/u\, l)$, where $S$ is the square dimension of the capillary passage 114.

By way of example, a nine cylinder, 20 cubic inch displacement pump or motor may have the following dimensions: $D_p = 1.281$ inches; $D_s = 1.562$ inches; $S = 0.0312$ inches; $l = 51.8$ inches (with a piston length of about 5.2 inches); and $u = 2.39 \times 10^{-6}$ lb.–Sec/in$^2$.

Typical values of $\Delta P$ and $q$ for one piston of the aforedescribed structure where $P_p = 400$ psi are $\Delta P = 66.3$ psi and $q = 0.0175$ in$^3$/sec.; where $P_p = 3,000$ psi, $\Delta P = 497$ psi and $q = 0.131$ in$^3$/sec. With these parameters, the film of fluid flowing between the bearing shoe and the swash plate is about 0.0046 of an inch under any operating pressure. Thus, according to the present invention, positive lubrication at all operating speeds is achieved and hydraulic balance is maintained by keeping the flow of lubricating fluid at a desirable low rate.

In any case, a basic aspect of the present invention is considered to be the provision of the tortuous capillary passage of extended length so that the passage can have a relatively large cross section to inhibit blockage and to provide ample lubricating flow under pressure from the piston head end to the swashplate end of the piston. As determined according to the factors herein set forth, this flow maintains on adequate film of lubricating fluid under any piston operating pressure and extends the service life of the piston components over those components of conventional swashplate pistons.

It should also be noted that the utility of the disclosed piston construction is equally applicable to hydraulic swashplate type motors and hydraulic swashplate type pumps.

Although the best mode contemplated for carrying out the present invention has been herein shown and described, it will be apparent that modification and variation may be made without departing from what is regarded to be the subject matter of the invention.

What is claimed is:

1. A hydraulic torque transmitting apparatus comprising a shaft, a cylinder block mounted upon said shaft for joint coaxial rotation and including at least one cylinder bore extending parallel to the rotary axis of the shaft and spaced radially therefrom, a piston slidably received in said cylinder bore, said piston including a pivotal mounting means at the end thereof which projects from said cylinder bore, a shoe pivotally mounted upon said pivotal mounting means, said shoe being provided with a generally flat outer face having a recess therein, a swash plate positioned about said shaft at an angle with respect to a plane extending perpendicularly through said shaft, the outer face of said shoe being arranged for pressure engagement with said swash plate, said shoe including a passage extending therethrough for communication with said recess, said piston having an axial bore therewithin, a plug received within said bore, said plug being provided with an exterior thread forming a capillary passage for providing communication between the end of the piston within the cylinder and the passage in said shoe so that hydraulic fluid may flow from said cylinder to said recess in said shoe in order to lubricate the pressure face of the shoe and provide a hydraulic balancing force on said piston, said capillary passage having a developed length at least three times as great as the linear distance between the ends of said piston in order to limit the flow through said piston while providing sufficient cross sectional area in the capillary passage to avoid plugging, a removable retaining member received within the end of the bore for retaining said plug within said bore, and retaining member including means for removably attaching said retaining member to said end of the piston within the cylinder to permit removal of the plug for cleaning, and removable filter means disposed in said bore between said plug and said retaining member.

2. In a hydraulic torque transmitting apparatus according to claim 1 wherein said developed length of the capillary passage is about 10 times the length of said piston.

3. In a hydraulic swash plate pump, a piston assembly comprising:
a cylindrical piston body having a ball coupling end, an axial bore extending therethrough and a piston head end, said bore having a portion within said ball coupling end wherein the diameter is enlarged so as to provide a flat annular bearing surface extending transversely to the axis of the piston;
a shoe pivotally mounted upon said ball coupling end of the piston body and having a generally flat outer face arranged for driving engagement with a swash plate;
means defining a recess in said flat face of the shoe;

a passage extending axially through said shoe and providing communication between said recess and said bore in said piston body;
a cylindrical plug having an axial passage in one end thereof, an exterior helical threaded passage in the sidewall thereof, and a radial passage connecting said axial passage with said helical threaded passage whereby said threaded passage, said axial passage, and said radial passage are in fluid communication; said helical threaded passage of the plug having a developed length at least three times as long as the axial length of said piston body;
a removable retainer member for removably retaining said plug tightly within said axial bore of the piston with said one end of the plug being in abutting engagement with said bearing surface, said helical passage being arranged for fluid communication with the exposed surface of the piston head and the outlet passage extending through the ball coupling end of the piston.

4. In a hydraulic swash plate pump according to claim 3 wherein said axial bore in the piston is formed within a tubular stem, said tubular stem being spaced from the outer cylindrical wall of the piston, and means for removably attaching said stem to said piston wall at the piston head end thereof.

5. In a hydraulic swash plate pump according to claim 3 wherein said retainer member for retaining said plug within said axial bore comprises an elongated member positioned coaxially with said plug, said retainer having one end for operatively engaging said plug to maintain it in position within the piston body with the opposite end thereof including a threaded portion for removably retaining said retainer member within said piston body so that the end face of the retainer member at said opposite end lies in the plane of and forms a portion of the piston face of the piston body, and means providing a passage through said retainer member for directing fluid from said piston face to said plug.

6. In a hydraulic swash plate pump according to claim 5 including a filtering means positioned between said plug and said retainer member.

* * * * *